US011468474B2

(12) United States Patent
Sood et al.

(10) Patent No.: US 11,468,474 B2
(45) Date of Patent: Oct. 11, 2022

(54) DATA PROCESSING TO PREDICT AFFINITY FOR GEOGRAPHICAL LOCATIONS

(71) Applicant: Meta Platforms, Inc., Menlo Park, CA (US)

(72) Inventors: Arpit Sood, Sunnyvale, CA (US); Gurpreetsingh Baljeetsingh Sachdev, Fremont, CA (US); Alex Meyer, Palo Alto, CA (US); Rohit Poddar, San Francisco, CA (US); Manisha Singh, Redwood City, CA (US); Tao Cui Baecklund, San Jose, CA (US); Anthony Mang Yau, San Francisco, CA (US); Shashikant Khandelwal, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 610 days.

(21) Appl. No.: 15/808,756

(22) Filed: Nov. 9, 2017

(65) Prior Publication Data

US 2019/0139089 A1     May 9, 2019

(51) Int. Cl.
*G06Q 30/02* (2012.01)
*G06Q 50/00* (2012.01)
*G06Q 10/06* (2012.01)
*G06N 5/02* (2006.01)

(52) U.S. Cl.
CPC ....... *G06Q 30/0259* (2013.01); *G06Q 10/067* (2013.01); *G06Q 50/01* (2013.01); *G06N 5/022* (2013.01)

(58) Field of Classification Search
USPC .......................... 701/533; 706/46; 705/14.1
See application file for complete search history.

(56) References Cited

U.S. PATENT DOCUMENTS

| 2007/0005419 A1* | 1/2007 | Horvitz | G06Q 30/02 |
| | | | 701/533 |
| 2009/0307168 A1* | 12/2009 | Bockius | G06F 16/9535 |
| | | | 706/46 |

* cited by examiner

*Primary Examiner* — Afaf Osman Bilal Ahmed
(74) *Attorney, Agent, or Firm* — Fenwick & West LLP

(57) ABSTRACT

An online system uses a model to determine affinities of users for geographical locations. Using the affinities, which may indicate travel-related preferences of the users, the online system may customize content items to include content captured by client devices of other users of the online system. For example, the online system presents to a particular user a content item including a photo or video of a geographical location captured by a camera of a client device of another user who is connected to the particular user. The model may implement, for example, collaborative filtering or other machine learning techniques to determine commonalities between users' travel affinities. Additionally, the model may determine latent properties or temporal trends of user preferences based on training data including historical actions performed on the online system or social data. The model may also classify different types of geographical locations.

20 Claims, 4 Drawing Sheets

DATA PROCESSING TO PREDICT AFFINITY FOR GEOGRAPHICAL LOCATIONS

BACKGROUND

This disclosure generally relates to data processing on an online system to predict affinity for geographical locations.

An online system typically has access to large amounts of content that may be of interest to other users of the online system. Because of the increasing popularity of these types of online systems and the increasing amount of user-specific information maintained by such online systems, an online system provides an ideal forum to increase awareness about content such as geographical locations or travel destinations. Existing systems can select content, for instance, using a textual analysis to determine content that matches the interests of users of the system. However, existing systems do not customize the content based on a particular users' travel preferences. Additionally, at a large scale of information, it is difficult and challenging to efficiently select specific content in which a given user is most likely interested and with which the user is likely to interact.

SUMMARY

An online system uses a model to determine affinities of users for geographical locations. Using the affinities, which may indicate travel-related preferences of the users, the online system may customize content items to include content captured by client devices of other users of the online system. For example, the online system presents to a particular user a content item including a photo or video of a geographical location captured by a camera of a client device of another user who is connected to the particular user. Geographical locations may include destinations based on a catalog of travel-related assets from third party systems. The model may implement, for example, collaborative filtering or other machine learning techniques to determine commonalities between users' travel affinities. Additionally, the model may determine latent properties or temporal trends of user preferences based on training data including historical actions performed on the online system or social data. The model may also classify different types of geographical locations.

In one embodiment, a method includes determining a first set of signals indicating affinity of a first user for a first geographical location and a second geographical location. The first signals include actions performed by the first user with a first set of objects associated with the first geographical location or the second geographical location on an online system using a first client device. The method further includes receiving content associated with the second geographical location from the first client device. The method further includes determining a second set of signals indicating affinity of a second user for the first geographical location. The second signals include actions performed by the second user with a second set of objects associated with the first geographical location on the online system using a second client device. The method further includes determining, by a model that receives as input the first and second sets of signals, that the second user is likely to have affinity for the second geographical location. The model is trained using actions performed by users of the online system on objects associated with geographical locations. The method further includes generating a content item describing the second geographical location and including at least the content received from the first client device. The method further includes providing the content item for presentation on the second client device.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
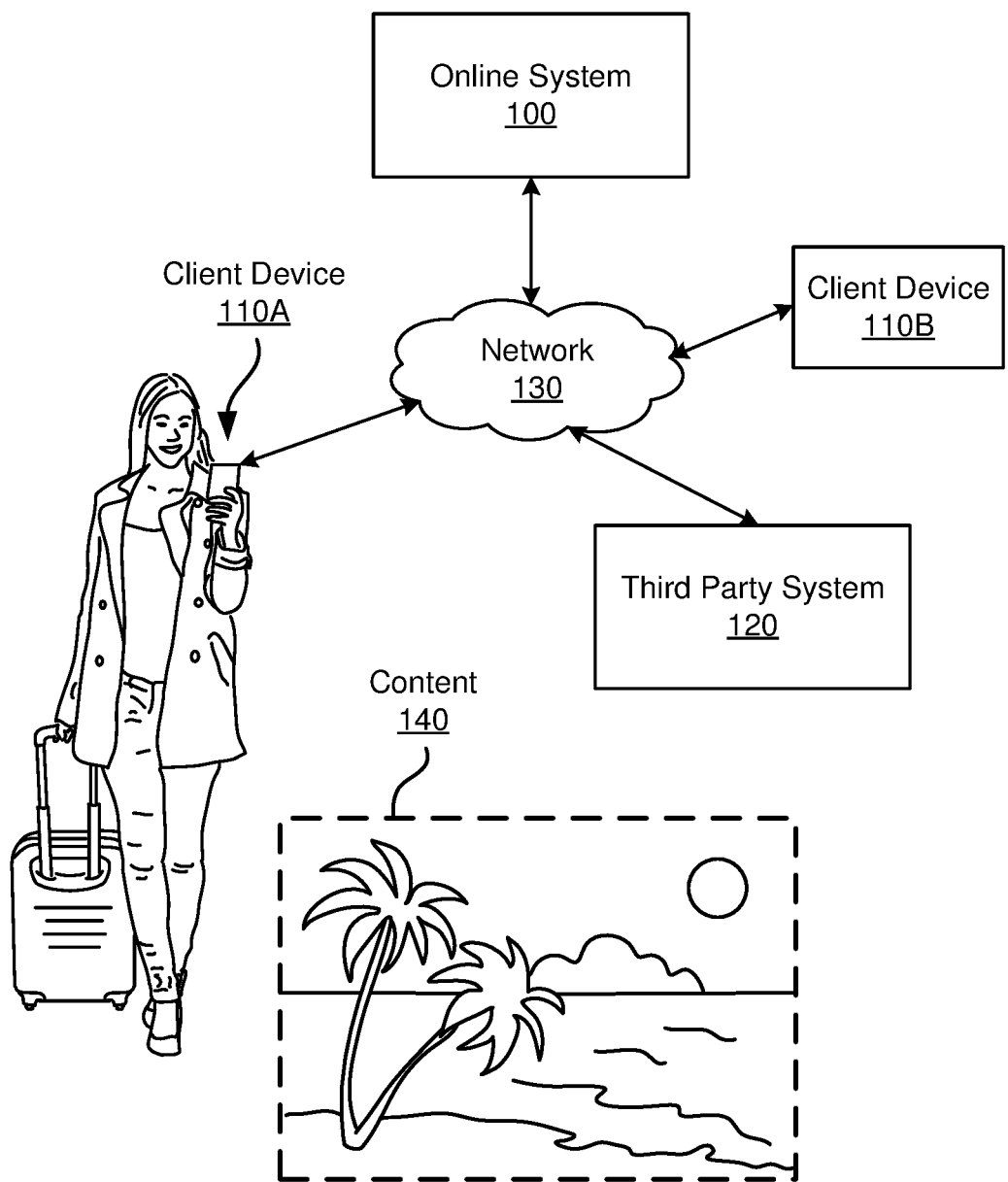
FIG. 1 is a diagram of a system environment for customizing content items according to one embodiment.

FIG. 1 is a diagram of a system environment for customizing content items according to one embodiment. The system environment includes an online system 100, client devices 110A and 110B (collectively referred to as client devices 110 or a client device 110), and a third party system 120, connected to each other via a network 130 (e.g., the Internet). In other embodiments, different and/or additional entities can be included in the system environment. For instance, though two client devices 110 and one third party system 120 is shown in FIG. 1, other embodiments may include additional client devices 110 or third party systems 120.

The client device 110 is a computing device capable of receiving user input as well as transmitting and/or receiving data via the network 130. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 130. In one embodiment, a client device 110 executes an application allowing a user of the client device 110 to interact with the online system 100 or a third party system 120. For example, a client device 110 executes a browser application to enable interaction between the client device 110 and the online system 100 via the network 130. In another embodiment, a client device 110 interacts with the online system 100 through an application programming interface (API) running on a native operating system of the client device 110, such as IOS® or ANDROID™.

In some embodiments, the client device 110 includes an image sensor or camera to capture media such as photos, images, videos, etc. Further, the client device 110 may also include other types of sensors to generate sensor data, e.g., an audio sensor to record audio, or a global positioning system (GPS) sensor to determine the geographical location of the client device 110. Media captured by the client device 110 may include metadata such as the timestamp or geographical location at which the client device 110 captured the corresponding photo, image, video, etc.

In one embodiment, a third party system 120 is an application provider communicating information describing applications for execution by a client device 110 or communicating data to client devices 110 for use by an application executing on the client device 110. In other embodiments, a third party system 120 provides content or other information for presentation via a client device 110. Each third party system 120 has a server outside of the domain of the online system 100. In one embodiment, the third party system 120 communicates content (e.g., content items, a website, or HTML code) from a server of the third party system 120 to a server of the online system 100. The content may be created by the entity that owns the third party system 120. Such an entity may be a company or other type of organization offering an asset (e.g., a product such as a tangible object or an intangible service such as lodging, transportation, or other travel-related items or activities), or message that the company wishes to promote.

The online system 100 allows users of the online system 100 to communicate or otherwise interact with each other and access content. The online system 100 receives information about the users, for example, user profile information and information about actions performed by users on the online system 100 or a third party system 120.

In some embodiments, the online system 100 is a social networking system. Users join the social networking system and add connections to other users to which they desire to be connected. At least some of these connections may be considered "friendship" type connections. Users of the social networking system may provide information about themselves, which is stored as user profiles. For example, users may provide their age, gender, current or past geographical locations (e.g., where users lived or visited), educational history, employment history and/or the like. The information provided by users may be used by the social networking system to direct information to the user. For example, the social networking system may recommend travel-related recommendations, social groups, events, other social networking objects, and potential connections (e.g., friends) to a user. A social networking system may also enable users to explicitly express interest in objects and/or concepts, such as brands, geographical locations, assets from a third party system 120 (e.g., products or services), celebrities, hobbies, sports teams, music, and the like. These interests may be used in a myriad of ways, including targeting content items and personalizing the user experience on the social networking system by showing relevant stories about other users of the social networking system based on shared interests.

In some embodiments, the online system 100 maintains and stores a social graph. The social graph includes nodes connected by a set of edges. Nodes represent users and other objects of the online system 100, such as web pages embodying concepts and entities, and edges connect the nodes. Each edge represents a particular interaction or connection between two nodes, such as a user expressing an interest in a news article shared by another user. As another example, an edge may represent a connection (e.g., a friendship-type relationship) established between two users. As such, the social graph includes data representative of the social signals of the social networking system. In one embodiment, the online system 100 generates the edges of the social graph based on the observed actions of its users.

The online system 100 also provides content items based on the information about the users or information from third party systems 120. In some embodiments, the online system 100 customizes the content items for users by using a model to predict a particular user's affinity for a geographical location. Responsive to determining that the affinity is greater than a threshold value, the online system 100 may determine that the particular user may be likely to travel to the geographical location, e.g., for a vacation. Moreover, the online system 100 may customize content items by including content received from the particular user's friends on the online system 100. In the embodiment shown in FIG. 1, the client device 110A provides content 140 to the online system 100. For example, the content 140 is a photo of a beach in Hawaii where another user (e.g., a friend of the particular user) of the client device 110B visited. Responsive to determining that the particular user is likely to travel to Hawaii, the online system may present to the particular user a content item including the photo of the beach. Accordingly, the online system 100 provides a more engaging user experience because its users are more likely to interact with the customized content items.

II. Example System Architecture of Online System

Figure 2:
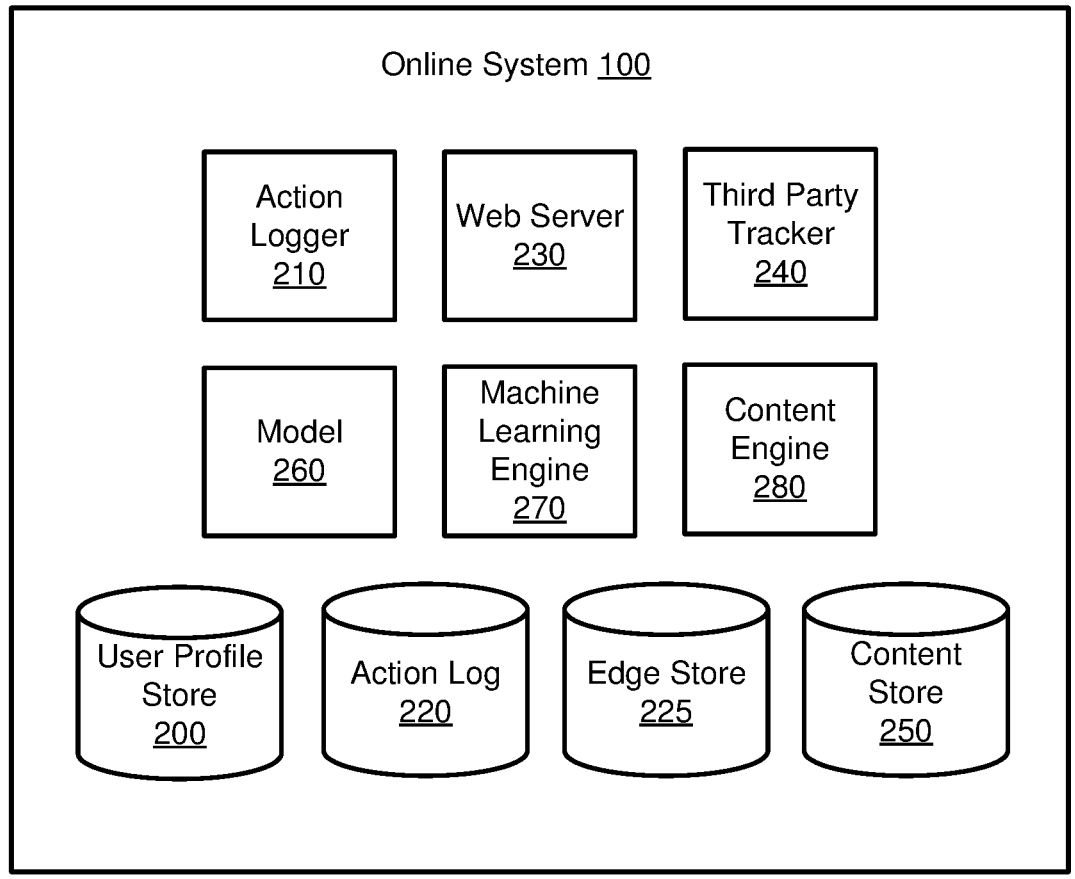
FIG. 2 is a block diagram illustrating the system architecture of an online system according to one embodiment.

FIG. 2 is a block diagram illustrating the system architecture of the online system 100 according to one embodiment. The online system 100 includes a user profile store 200, action logger 210, action log 220, edge store 225, web server 230, third party tracker 240, content store 250, model 260, machine learning engine 270, and content engine 280. In other embodiments, the online system 100 may include additional, fewer, or different components for various applications. Conventional components such as network interfaces, security functions, load balancers, failover servers, management and network operations consoles, and the like are not shown so as to not obscure the details of the system architecture.

The user profile store 200 stores user profiles of users of the online system 100. A user profile includes declarative information about the user that was explicitly shared by the user and may also include profile information inferred by the online system 100. In one embodiment, a user profile includes multiple data fields, each describing one or more attributes of the corresponding user of the online system 100. Examples of information stored in a user profile include biographic, demographic, and other types of descriptive information, such as family information, travel history, residence history, geographical locations, pets, membership of organizations (e.g., American Automobile Association (AAA), loyalty programs of third party systems 120, government organizations, veteran or military groups, or senior citizen groups), occupation, educational history, gender, hobbies or preferences, etc.

A user profile may also store other information provided by the user, for example, images, photos, videos, or other types of data from a client device 110. In certain embodiments, photos of users may be tagged with identification information of users of the online system 100 displayed in the photos. A user profile in the user profile store 200 may also maintain references to actions by the corresponding user performed on the online system 100. The user profile store 200 further stores data describing one or more relationships between different users and allows users to specify their relationships with other users. For example, these user-defined relationships allow users to generate relationships with other users that parallel the user's real-life relationships, such as friends, co-workers, partners, etc.

The user profile store 200 can store user profiles of individuals, as well as user profiles of entities such as companies or organizations, e.g., that own a third party system 120. This allows an entity to establish a presence on the online system 100 for connecting and exchanging content with other users of the online system 100. The entity may post information about itself, about items provided by the entity, for example, travel-related assets of the entity, or provide other information to users of the online system 100 using a brand page of the entity's user profile. Users of the online system 100 may connect to the brand page to receive information posted to the brand page or to receive information from the brand page. A user profile of the brand page may include information about the entity itself, providing users with background or informational data about the entity.

The action logger 210 receives communications about user actions internal to and/or external to the online system 100, populating the action log 220 with information about user actions. Examples of actions include adding a connection to another user, sending a message to another user, uploading media, reading a message from another user, viewing content provided by another user, attending an event posted by another user, among others. In addition, a number of actions may involve an object and one or more particular users, so these actions correspond to those users as well and stored in the action log 220.

The action log 220 may be used by the online system 100 to track user actions on the online system 100, as well as actions on third party systems 120 that communicate information to the online system 100. Users may interact with various objects on the online system 100 or a third party system 120, and the action logger 210 stores information describing these interactions in the action log 220. Examples of interactions with objects include: interacting with a content item, viewing a brand page of a third party system 120, booking transportation or lodging for a trip, requesting certain amenities for a lodging, checking-in to or checking-out of physical geographical locations (e.g., a lodging, airport, transit stations, points-of-interest, commercial locations, etc.) via a client device 110, expressing an affinity or preference for an object (e.g., associated with a geographical location), for example, by "liking" the object.

Additionally, the action log 220 may record a user's interactions with content (e.g., sponsored or non-sponsored content) on the online system 100 as well as with other applications operating on the online system 100 or a third party system 120. In some embodiments, data from the action log 220 is used to infer interests, affinities, or preferences of a user, augmenting the interests included in the user's user profile and allowing a more complete understanding of user affinities. The action log 220 can record information about client devices 110 that a user uses to interact with the online system 100. For example, the action log 220 records whether the user used a laptop computer or smartphone client device 110 to interact with the online system 100. Further, the action log 220 may include information about the types of client devices 110, e.g., smartphone running an IOS® or ANDROID™ operating system.

The action log 220 may also store user actions performed on a third party system 120, such as an external website or via a client device 120, and communicated to the online system 100. For example, the external website may recognize a user of an online system 100 through a social plug-in enabling the external website to identify the user of the online system 100. Since users of the online system 100 are uniquely identifiable, external websites may communicate information about a user's actions outside of the online system 100 to the online system 100 for association with the user. Hence, the action log 220 can record information about actions that users perform on a third party system 120 including webpage viewing histories, content that were engaged, acquisitions made, and other patterns from past actions. The action log 220 can also store information about user actions performed on a third party system 120 received from the third party tracker 240, which is further described below.

In one embodiment, the edge store 225 stores information describing connections between users and other objects on the online system 100 as edges. Edges may be defined by users, allowing users to specify their relationships with other users, e.g., that parallel the users' real-life relationships such as friends, co-workers, family members, etc. The action logger 210 may generate edges when users interact with objects in the online system 100, e.g., expressing interest in a page on the online system 100, sharing a link with other users of the online system 100, and commenting on posts made by other users of the online system 100.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 100, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

In one embodiment, the edge store 225 stores information about edges, such as affinity scores for objects, interests, and other users. Affinity scores may be computed by the online system 100 over time to approximate a user's interest in an object or in another user in the online system 100 based on the actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 200, or the user profile store 200 may access the edge store 225 to determine connections between users.

The web server 230 links the online system 100 via the network 130 to the client devices 110 and third party systems 120. The web server 230 serves web pages, as well as other web-related content, such as JAVA®, FLASH®, XML and so forth. The web server 230 may receive and route messages between the online system 100, client devices 110, and third party systems 120, for example, instant messages, queued messages (e.g., email), text messages, short message service (SMS) messages, or messages sent using any other suitable messaging technique. A user may send a request to the web server 230 to upload information (e.g., images, photos, videos, etc.) that are stored by the online system 100 in the user profile store 200. Additionally, the web server 230 may provide application programming interface (API) functionality to send data directly to native client device operating systems, such as IOS®, ANDROID™, WEBOS® or RIM®.

The third party tracker 240 receives third party information from third party systems 120 and stores the received information in the user profile store 200, action log 220, content store 250, or other databases. In one embodiment, the third party tracker 240 receives, from a third party system 120, a catalog describing travel-related assets of an entity associated with the third party system 120. For example, an airline provides a catalog including information about flights, and a hotel provides a catalog including information about lodging (e.g., hotel rooms), available via the associated third party system 120. Flights or lodgings may correspond to at least one value. A value may be broken down into sub-values, e.g., a base value or a values for various fees for a hotel room or flight ticket. In addition, values may be valid for a predetermined window of time (e.g., a number of hours, days, or weeks). Information describing lodging may include, e.g., a type of a lodging (e.g., suite, double bed room, single bed room, studio, etc.), a geographical location of the lodging, or amenities of a lodging, etc. Information describing a flight may include, e.g., an origin and destination airport represented by International Air Transport Association (IATA) codes, a departure and arrival time, or a ticket type (e.g., first class, business class, or economy class), etc. Catalog information stored in the content store 250 may be updated over time due to changes in availability of assets or other factors.

In some embodiments, the third party tracker 240 receives information from third party systems 120 using pixel tracking. The third party tracker 240 provides a pixel to a third party system 120 to be included in a user interface of the third party system 120. The third party system 120 provides third party information to the third party tracker 240 in response to a user of the online system 100 viewing the pixel of the user interface. For example, the pixel is included in a user interface displaying a website of the third party system 120, e.g., a website for a process for acquiring an asset (e.g., product or service) available via the third party system 120 such as booking transportation or lodging for a trip. When the client device 110 of the user displays the pixel of the website on the display screen of the client device, the third party system 120 provides third party information to the third party tracker 240 indicating that the user viewed the website. Additionally, the third party information describes the information about the asset, and may indicate that the user was close to completing a booking of a lodging or transportation but has not yet completed the booking. In addition to pixel tracking, the third party tracker 240 can also receive user information from cookies (also known as web cookies, Internet cookies, or browser cookies) of client devices 110.

The online system 100 may use information from the third party tracker 240 along with information from the user profile store 200 and/or action log 220 to build a travel user profile for a user including travel-related actions performed by the user. The actions indicate travel history information, for example, cities, regions, states, or countries visited based on GPS data or internet protocol (IP) addresses of users' client devices 110, time period of travel (e.g., day or month of the year), number of users traveling (e.g., as a group, or a count of adults and kids), frequency of trips for a duration of time (e.g., the past certain number of years), travel type (business or personal), booking information for lodging or transportation, etc. Booking information for lodging may include a name of a hotel, geographical location of a hotel (e.g., neighborhood or zip code), number of rooms, type of room or related services, dates of stay, hotel star rating, price range, hotel brand, etc. Booking information for flights may include an origin and destination airport, type of ticket, number of tickets, dates of travel, airline brand, etc.

The actions may also indicate a travel status of a user, e.g., whether the user is currently traveling and a current or planned destination of the user. The online system 100 may compare a check-in or check-out date against a current date to determine the user's travel status. In addition, the travel user profile may indicate a geographical location, lodging, or transportation that a user last interacted with, e.g., viewed or searched for using the online system 100 or a third party system 120. The online system 100 may determine a frequency at which a user searched for hotels or flights during a period of time, as well as target dates for travel associated with the searches.

The model 260, machine learning engine 270, and content engine 280 of the online system 100 are further described below with reference to FIGS. 3-4.

III. Example Process Flow

Figure 3:
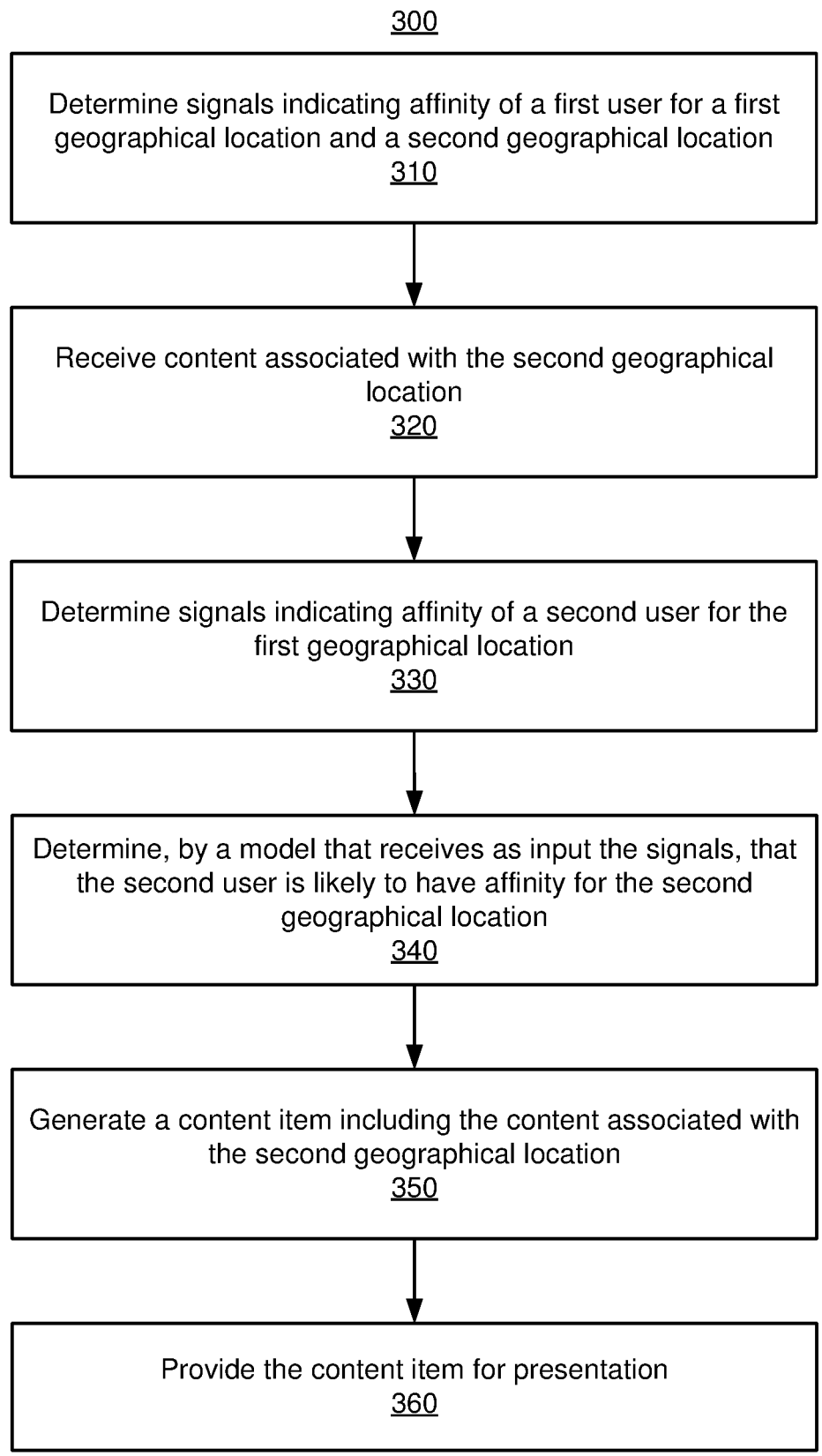
FIG. 3 is a flowchart illustrating a process for determining affinity for geographical locations using a model according to one embodiment.

FIG. 3 is a flowchart illustrating a process 300 for determining affinity for geographical locations using the model 260 according to one embodiment. In some embodiments, the process 300 is performed by the online system 100 within the system environment in FIG. 1. The process 300 may include different or additional steps than those described in conjunction with FIG. 3 in some embodiments or perform steps in different orders than the order described in conjunction with FIG. 3. FIG. 4 is a diagram illustrating a customized content item 400 according to one embodiment. The online system 100 may use the process 300 to customize the content item 400 shown in FIG. 4. For sake of example, the description below will refer to an embodiment including first user and second user of the online system 100 who each have affinity for beaches. The features described herein may also be included in other embodiments for users with affinities for other types of geographical locations or travel preferences, e.g., flights, lodging, transportation, etc.

The online system 100 determines 310 signals indicating affinity of a first user for a first geographical location and a second geographical location. The signals may include actions performed by the first user with objects associated with the first geographical location and a second geographical location using a client device 110A (e.g., shown in FIG. 1). Additionally, the signals may be retrieved from the user profile store 200, action log 220, edge store 225, or content store 250. In an example use case, the first geographical location is a beach in Los Angeles, and the second geographical location is a beach in Hawaii.

In an embodiment, the first user visits a brand page of a hotel on the online system 100, comments on photos posted on the brand page, and/or books lodging at the hotel, each of which may correspond to actions performed with objects associated with a geographical location, and thus used as signals. During a trip, the first user uses the client device 110A to check-in to the hotel in Hawaii. The hotel may be associated with a third party system 120 that provides information about the first user's check-in to the third party tracker 240 for storage in the online system 100. Further, the first user uses the client device 110A to take a photo of the beach in Hawaii and uploads the photo (e.g., content 140 shown in FIG. 1) to the online system 100. The online system 100 may use metadata of the photo (e.g., GPS information) or a comment (e.g., "relaxing at the beach in Hawaii) provided with the photo by the first user to determine that the photo was captured at the beach.

The online system 100 receives 320 content associated with the second geographical location from the client device 110A. Referring to the above example, the content may be the photo of the beach in Hawaii.

The online system 100 determines 330 signals indicating affinity of a second user for the first geographical location. The signals may include actions performed by the second user with objects associated with the first geographical location using a client device 110B (e.g., shown in FIG. 1). Additionally, the signals may be retrieved from the user profile store 200, action log 220, edge store 225, or content store 250. Following in the same example use case, the signal indicates that the second user also has affinity for the beach in Los Angeles, e.g., the second user booked surfing lessons at the beach from website of a third party system 120 that provided the booking information to the third party tracker 240.

The online system 100 may use user profile information and/or the signals to determine that the first and second user have one or more common traits. For example, the online system 100 determines that the users are both currently located in San Francisco, Calif., attend a particular school, work for a particular employer, are members of a particular group such as a rewards or loyalty program, etc. The online system 100 may also determine a connection between the first and second users on the online system 100. For instance, the online system 100 determines that the second user is connected to the first user as a friend or family member.

The model 260 of the online system 100 receives as input the signals and determines 340 that the second user is likely to have affinity for the second geographical location. In some embodiments, the model 260 also receives as input one or more common traits of users. The model 260 is trained using actions performed by users of the online system 100 on objects associated with geographical locations, travel user profiles, travel-related information, social data, historical information, etc., from the user profile store 200, action log 220, edge store 225, or content store 250. The actions may be aggregated over multiple trips taken by a user, or multiple trips that a user has planned or searched. For instance, the model 260 determines from training data that each user of a sample group of users visited both the first and second geographical locations (e.g., users who visit the beach in Los Angeles tend to also visit the beach in Hawaii, or vice versa). The model 260 may implement collaborative filtering, information filtering, or other types of machine learning algorithms to automate predictions regarding travel-related affinities or preferences of the users. The model 260 may determine predictions of a user's travel preferences or travel intent such as preferred destination types, dates or time of travel, transportation modes, frequency of travel, type of flight class, type of hotel, loyalty or rewards programs, brand, etc. In some embodiments, the model 260 determines a confidence level for predictions, which may indicate a likelihood that a user will book transportation, lodging, or other services for a trip.

In some embodiments, the machine learning engine 270 uses machine learning techniques to train one or more models 260 to generate a level of affinity of a particular user for a certain geographical location. Machine learning techniques include, for example, linear regression, decision trees, support vector machines, classifiers (e.g., a Naive Bayes classifier), gradient boosting, neural networks, deep learning, etc. The level of affinity (or confidence level of the predictions made by the model 260) may be proportional to a number of common traits between users. In particular, the model 260 may determine a greater level of affinity for the second user responsive to determining that the first and second users share an extensive travel history, relative to determining that the first and second users have only one previously-visited geographical location in common. In some embodiments, the model 260 boosts (i.e., increases) the level of affinity responsive to determining that the first and second users are connected on the online system 100. In some embodiments, the models 260 assigns different weights to signals to determine the level of affinity. The weights may vary based on a type of the signal, e.g., a check-in at a geographical location has a greater weight than visiting a website including information about the geographical location.

In some embodiments, the machine learning engine 270 uses the training labels to partition information (e.g., the determined signals) into positive and negative feature vectors for training data of the model 260. For example, positive feature vectors describe assets or customized content of content items that were interacted with by a user, while negative feature vectors describe content items that were presented to users but not interacted with by a user. Thus, the model 260 can predict affinities of users by learning based on the context of travel-related preferences and actions of other users of the online system 100. The model 260 may also organize the training data based on demographic information of the users. Accordingly, the model 260 may determine latent properties indicating preferences for users of a specific age range, gender, residence geographical location, etc.

In some embodiments, the model 260 classifies geographical locations into different types of classifications. The model 260 may determine the classifications based on a manually provided predetermined list, or automatically by extracting common parameters of geographical locations in training data. Example types of geographical locations include destinations classified as beach, sporty, city, suburb, nature, etc. For example, the model 260 uses image processing or natural language processing to distinguish a first set of geographical locations of beaches from a second set of geographical locations of mountains. In particular, content associated with beaches may include photos of the ocean or keywords such as "sun" or "surf," while content associated with mountains may include photos of snow or keywords such as "hiking" or "ski." The model 260 may determine levels of affinity based on the classifications. Referring to the above example, the model 260 may determine that the first and second geographical locations are both classified as beaches. Thus, the model 260 may determine that the first and second users are interested in visiting beaches and that the second user is more likely to have affinity for the beach in Hawaii because the second user (as well as the first user) already visited another beach in Los Angeles.

In some embodiments, training data for the model 260 indicates time periods during which users of the online system 100 visited geographical locations. Further, the training data may also indicate an average temperature the geographical location during the time period at which the users visited. Thus, the model 260 may determine temporal patterns or trends in users' travel-preferences. In particular, the model 260 learns that a geographical location is a more popular destination during a certain time range of the year (e.g., users typically travel to beaches during the summer and to mountain resorts in the winter). Moreover, the model 260 may learn that users from a certain geographical region tend to travel to other geographical regions having different average temperatures during a certain time range (e.g., users from areas that are colder in the winter travel to warmer destinations).

The content engine 280 generates 350 a content item describing the second geographical location and including at least the content received from the client device 110A (e.g., the photo of the beach in Hawaii). In some embodiments, the content engine 280 generates the content item responsive to determining that a level of the second user's affinity for the second geographical location is greater than a threshold value. The content engine 280 provides 360 the content item for presentation on the client device 110B of the second user.

In various embodiments, the content engine 280 generates content items customized to specific users and stores the content items in the content store 250. The content engine 280 may also retrieve previously generated content items from the content store 250 or any other source of content items (or content) accessible to the online system 100. The content engine 280 can analyze information stored in the user profile store 200, action log 220, or other components of the online system 100, to identify information useful for generating content items. The content engine 280 may use content provided by users of the online system 100 to generate content items.

In some embodiments, the content engine 280 generates content items including sponsored content for presentation to a user of the online system 100 and having a corresponding amount of compensation. The sponsored content may be provided by a third party system 120 and include, e.g., an image, a photo, video, audio, or any other suitable form of information presented to a user. For example, a sponsored content is an advertisement. In various embodiments, sponsored content specifies a page of content, e.g., a landing page or a network address of a website for obtaining an asset or information from the third party system 120. In some embodiments, the amount of compensation is provided by a third party system 120 (providing the corresponding sponsored content) to the online system 100 responsive to the online system 100 satisfying a criteria. The criteria may include, e.g., presenting the sponsored content in a content item to a user, receiving a user interaction with a presented content item, receiving indication that a user made progress or completed a process for obtaining an asset from the third party system 120 (e.g., booking a flight or hotel room), performing a check-in at a geographical location indicated by a presented content item, etc.

Figure 4:
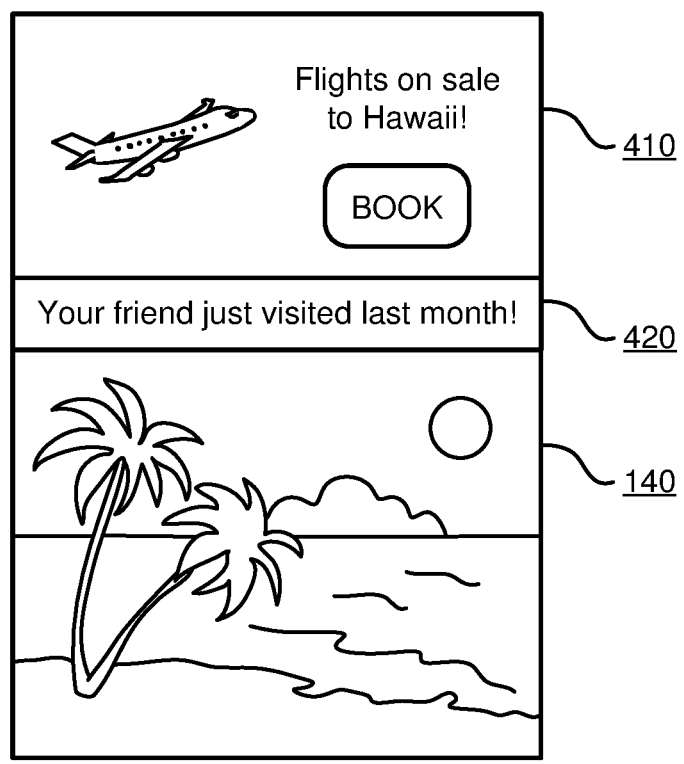
FIG. 4 is a diagram illustrating a customized content item according to one embodiment.

In the embodiment shown in FIG. 4, the example content item 400 includes the content 140 provided by the first user, sponsored content 410, and a custom message 420. Specifically, the content 140 is the photo of the beach in Hawaii previously described with reference to FIG. 1. The online system 100 receives the sponsored content 410 from a third party system 120 for promoting an asset of a third party system 120. For example, the online system 100 receives a catalog of flights on sale to Hawaii (e.g., from an origin airport nearby the residence of the second user). The third party system 120 wants to present the sponsored content 410 to target users of the online system 100 that are likely to travel to Hawaii. The content engine 280 customizes the content item 400 by including other content relevant to the sponsored content 410 or the geographical location of Hawaii.

In an embodiment, responsive to the online system 100 determining that the first and second users are connected and that the second user has affinity for the second geographical location (e.g., the beach in Hawaii), the content engine 280 may customize the content item 400 by including the content 140. The content engine 280 may select the photo of the beach in Hawaii from a set of different or multiple media content received from the client device 110A of the first user. For instance, the first user used the client device 110A to capture different photos and videos during a trip in Hawaii. Additionally, the content engine 280 may also include the custom message 420 (e.g., "your friend just visited last month!") responsive to determining that the first user traveled to the beach in Hawaii last month (or during another time period), e.g., according to information from the action log 220.

The second user may be more likely to interact with the content item 400, relative to another content item including a generic photo of a beach, because the content engine 280 customized the content item 400 to include content from the first user, i.e., the second user's friend. In some embodiments, the online system 100 determines to present the sponsored content 410 responsive to determining that the first user obtained an asset from the third party system 120 (e.g., booked flights from the same airline). Generally, the online system 100 may use the model 260 to determine that users who have common traits or are connected are likely to obtain assets from similar third party systems 120.

Thus, the online system 100 solves a technical problem faced by third party systems 120 and associated entities that want to promote their assets (e.g., flight tickets, hotel rooms, travel activities, etc.) to users of the online system 100. In conventional systems, the entities may provide sponsored content describing their assets to the users, but the sponsored content may be the same or at least partly similar from user-to-user, and thus may be perceived by users as being generic. Since users may typically be less interested in generic content, the users are less likely to interact with the sponsored content. Consequently, the entities and/or the conventional systems are not efficiently using their computational resources to provide content to users (e.g., memory to store content items or network bandwidth to transmit content items from servers to client devices 110).

In contrast to conventional systems, the online system 100 leverages the social data or other information collected by the online system 100 to customize content items. Content items may be customized to include media such as photos, images, and videos, as well as text-based information, ratings, metrics, geographical information, etc. provided by users of the online system 100. As a result, users perceive the customized content items as organic content (e.g., tailored to their affinities or affinities of their friends, or as part of a news feed of content items including non-sponsored content) and are more likely to interact with sponsored content included in the customized content items. Therefore, entities associated with third party systems 120 may receive greater revenue from users obtaining assets of the entities, and online systems 100 may also receive greater revenue from the third party systems 120 in return for presenting sponsored content to users, e.g., at large scale. This problem addressed by the online system 100 is unique to systems providing content items over the Internet (e.g., the network 130) in an online environment. For example, entities that provide sponsored content online seek to increase metrics such as online views of content items or webpages, click-through rate (CTR) of content items, or conversion rates of users completing a process to obtain assets from the entity, e.g., completing an online check-out process to book a flight ticket or hotel room.

IV. Alternative Embodiments

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   training, by an online system over time, a machine learning model based on training data comprising actions performed by a plurality of users of the online system on objects associated with a plurality of geographical locations, the model trained using training labels to partition information about signals of affinity of users for different objects into positive and negative feature vectors to allow the model to predict affinities of the users for other objects, wherein objects and users represent nodes in a graph that are connected by edges that specify relationships between users or that define interactions of users with objects;
   determining, by the online system, a first set of signals indicating affinity of a first user for a first geographical location and a second geographical location, the first set of signals including actions performed, using a first client device, by the first user with a first set of objects within the graph that are associated with the first geographical location and the second geographical location, wherein the first set of signals provide additional training data for the model;
   receiving, at the online system, content associated with the second geographical location from the first client device;
   determining, by the online system, a second set of signals indicating affinity of a second user for the first geographical location, the second set of signals including actions performed by the second user, using a second client device, with a second set of objects within the graph that are associated with the first geographical location, wherein the second set of signals provide additional training data for the model;
   determining, by the model based at least in part on the first and second sets of signals, that the second user is likely to have affinity for the second geographical location as an object in the graph;
   generating, by the online system, a content item describing the second geographical location and including at least the content received from the first client device; and
   providing, by the online system, the content item for presentation on the second client device.

2. The method of claim 1, wherein receiving the content with the second geographical location comprises:
   receiving at least one photo or video captured by the first client device, the at least one photo or video depicting the second geographical location, the content item including the at least one photo or video.

3. The method of claim 1, wherein the model classifies geographical locations into a plurality of classifications, and wherein determining that the second user is likely to have affinity for the second geographical location comprises:
   determining, by the model, that the first geographical location and the second geographical location have a same one of the plurality of classifications.

4. The method of claim 1, wherein the model implements collaborative filtering and determines that the first and second user each have affinity for the first geographical location.

5. The method of claim 1, further comprising:
   determining that the second user is connected to the first user on the online system, the content item indicating that the content associated with the second geographical location is provided by the first user.

6. The method of claim 1, further comprising:
   determining, by the model using the actions performed by the plurality of users, that each of the plurality of users visited the first geographical location and the second geographical location.

7. The method of claim 1, further comprising:
   determining a time period during which the first user visited the second geographical location, the content item indicating the time period.

8. The method of claim 7, wherein the actions used to train the model indicate (i) time periods during which the plurality of users visited the plurality of geographical locations and (ii) an average temperature of each of the plurality of geographical locations during the corresponding time period, and wherein determining that the second user is likely to have affinity for the second geographical location comprises:
   determining, by the model, that the second user is likely to visit the second geographical location during the time period.

9. The method of claim 1, further comprising:
receiving, by the online system from a third party system, sponsored content associated with the second geographical location, the content item further including the sponsored content.

10. The method of claim 9, further comprising:
determining to include the sponsored content in the content item responsive to determining that the first user obtained an asset from the third party system.

11. A non-transitory computer-readable storage medium storing instructions that when executed by a processor cause the processor to perform steps including:
training, by an online system over time, a machine learning model based on training data comprising actions performed by a plurality of users of the online system on objects associated with a plurality of geographical locations, the model trained using training labels to partition information about signals of affinity of users for different objects into positive and negative feature vectors to allow the model to predict affinities of the users for other objects, wherein objects and users represent nodes in a graph that are connected by edges that specify relationships between users or that define interactions of users with objects;
determining, by the online system, a first set of signals indicating affinity of a first user for a first geographical location and a second geographical location, the first set of signals including actions performed, using a first client device, by the first user with a first set of objects within the graph that are associated with the first geographical location and the second geographical location, wherein the first set of signals provide additional training data for the model;
receiving, at the online system, content associated with the second geographical location from the first client device;
determining, by the online system, a second set of signals indicating affinity of a second user for the first geographical location, the second set of signals including actions performed by the second user, using a second client device, with a second set of objects within the graph that are associated with the first geographical location, wherein the second set of signals provide additional training data for the model;
determining, by the model based at least in part on the first and second sets of signals, that the second user is likely to have affinity for the second geographical location as an object in the graph;
generating, by the online system, a content item describing the second geographical location and including at least the content received from the first client device; and
providing, by the online system, the content item for presentation on the second client device.

12. The non-transitory computer-readable storage medium of claim 11, wherein receiving the content with the second geographical location comprises:
receiving at least one photo or video captured by the first client device, the at least one photo or video depicting the second geographical location, the content item including the at least one photo or video.

13. The non-transitory computer-readable storage medium of claim 11, wherein the model classifies geographical locations into a plurality of classifications, and wherein determining that the second user is likely to have affinity for the second geographical location comprises:
determining, by the model, that the first geographical location and the second geographical location have a same one of the plurality of classifications.

14. The non-transitory computer-readable storage medium of claim 11, wherein the model implements collaborative filtering and determines that the first and second user each have affinity for the first geographical location.

15. The non-transitory computer-readable storage medium of claim 11, wherein the instructions when executed further cause the processor to perform steps including:
determining that the second user is connected to the first user on the online system, the content item indicating that the content associated with the second geographical location is provided by the first user.

16. The non-transitory computer-readable storage medium of claim 11, wherein the instructions when executed further cause the processor to perform steps including:
determining, by the model using the actions performed by the plurality of users, that each of the plurality of users visited the first geographical location and the second geographical location.

17. The non-transitory computer-readable storage medium of claim 11, wherein the instructions when executed further cause the processor to perform steps including:
determining a time period during which the first user visited the second geographical location, the content item indicating the time period.

18. The non-transitory computer-readable storage medium of claim 17, wherein the actions used to train the model indicate (i) time periods during which the plurality of users visited the plurality of geographical locations and (ii) an average temperature of each of the plurality of geographical locations during the corresponding time period, and wherein determining that the second user is likely to have affinity for the second geographical location comprises:
determining, by the model, that the second user is likely to visit the second geographical location during the time period.

19. The non-transitory computer-readable storage medium of claim 11, wherein the instructions when executed further cause the processor to perform steps including:
receiving, by the online system from a third party system, sponsored content associated with the second geographical location, the content item further including the sponsored content.

20. The method of claim 1, wherein the training of the model further comprises training data based on demographic information of users in addition to the training based on actions of the user, and wherein the determining by the model further comprises a determination of latent properties indicating preferences of the second user based on demographics of the user, the preferences indicating affinity for the second geographical location.

* * * * *